No. 769,353.

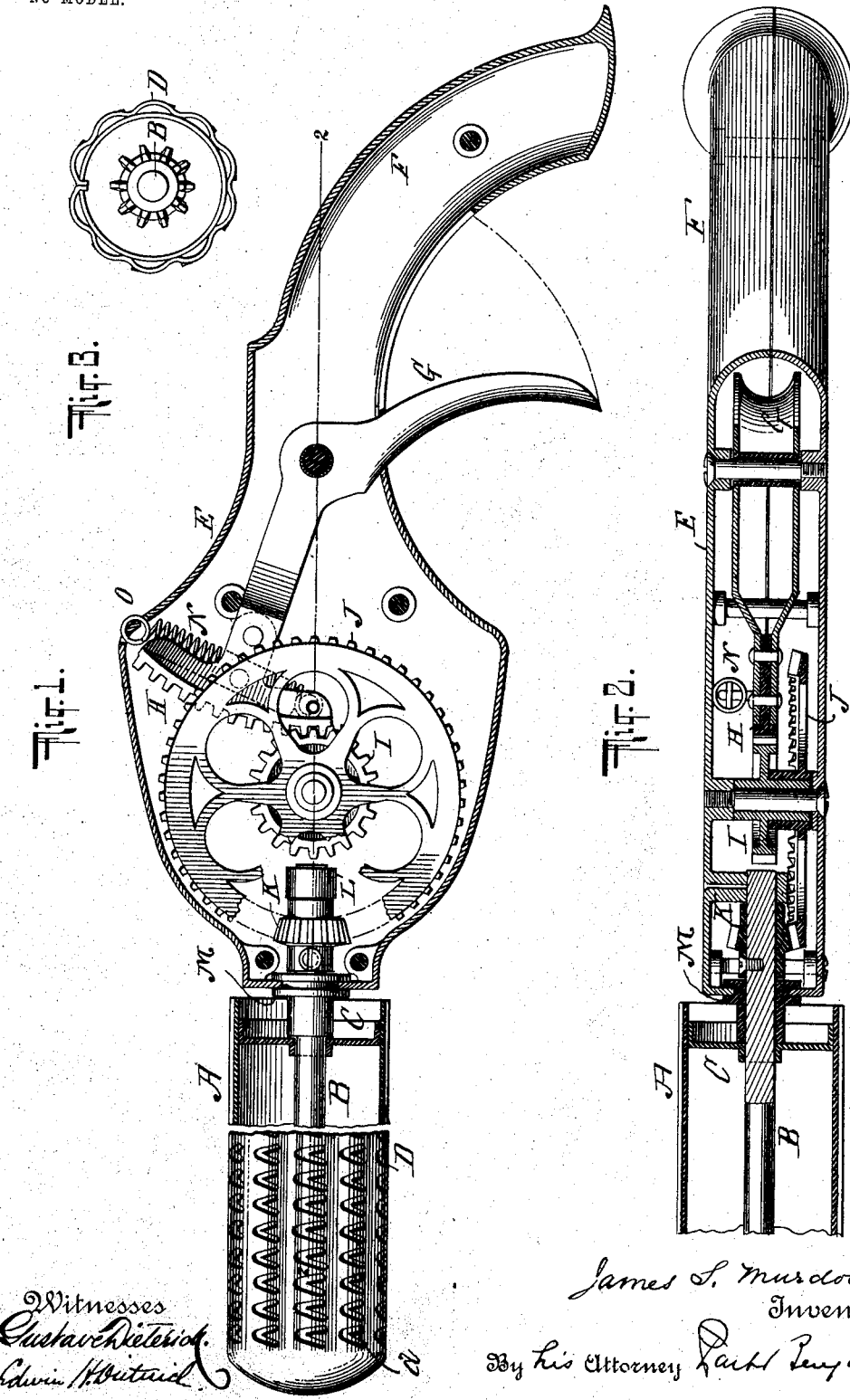

Patented September 6, 1904.

UNITED STATES PATENT OFFICE.

JAMES SAVAGE MURDOCH, OF CHARLESTON, SOUTH CAROLINA.

HAND COTTON-PICKER.

SPECIFICATION forming part of Letters Patent No. 769,353, dated September 6, 1904.

Application filed March 29, 1904. Serial No. 200,541. (No model.)

*To all whom it may concern:*

Be it known that I, JAMES SAVAGE MURDOCH, of Charleston, Charleston county, South Carolina, have invented a new and useful Improvement in Hand Cotton-Pickers, of which the following is a specification.

The invention relates to the art of picking cotton from the plant and includes, first, the improvement in said art which consists in introducing in the direction of its longitudinal axis a cylindrical stem having circumferential teeth into proximity to the cotton in the open boll and manually rotating said stem on its longitudinal axis with points of teeth foremost to gather said cotton and in the reverse direction to release the same, and, second, in the construction of the device for holding said mechanism for manually actuating said stem, as more particularly pointed out in the claims.

In the accompanying drawings, Figure 1 is a side elevation with one wall of the protecting-case removed and a portion of the driving-gear broken away. Fig. 2 is a section on the line 2 2 of Fig. 1, and Fig. 3 is an end view of the stem and bevel-pinion thereon.

Similar letters of reference indicate like parts.

The picking-stem A may be of any suitable construction. As here illustrated, a central rod B is shouldered to receive the flanged ring C and preferably a second and similar ring. (Not shown.) The said rings C support the stem-cylinder D, which is of sheet metal, preferably rounded at its end and provided with longitudinal rows of V-shaped slots, which form sharp teeth $a$, guarded by the adjacent metal and all turned in the same direction. When such a stem is rotated on its axis, points of teeth foremost, in proximity to an open cotton-boll, the elastic lint will enter the openings in front of the teeth, and so become engaged thereby, while leaves, twigs, or other trash will not be so engaged. To free the lint from the teeth, it is merely necessary to rotate the stem in the opposite direction. Such stems as the foregoing have been employed in cotton-picking machines and therein driven by mechanism actuated by the movement of the machine itself upon its wheels when drawn along and over the row. In all machines of this sort a practically fatal difficulty has been encountered in the impossibility of certainly getting the stems to the bolls. The stems would of course enter the plant and revolve therein; but they often missed the bolls, and, what was worse, because they were moved into the plant laterally leaves, twigs, or other foreign material could easily intrude between stem and cotton. When such bodies intervened, (and in the comparatively close foliage of the plant this constantly happened,) the cotton was screened, the teeth could not engage it, and as the machine moved on they left the lint ungathered in the bolls in such large percentage as to neutralize whatever advantages the machine might offer over the ordinary process of hand-picking.

I have discovered that the stem is an effective instrument, provided it is put where it can do its work, and that this is best done by mechanism which not only gives to the stem its proper rotation, timed in proper manner, but which enables the operator both to actuate the stem by hand and also by hand to introduce it into the plant end foremost, and so to bring it directly to the open bolls. One stem introduced successively and intelligently to the open bolls of a plant and then operated is better than a multiplicity of stems moved at random into and through a plant by an unthinking machine.

I am aware that hand cotton-picking contrivances have been devised; but none has ever come into even limited employment. I am not aware, however, that any one has ever hitherto arranged the axially-rotating stem in combination with a mechanism capable of actuating it by hand in proper manner and also in such portable form as that the operator can manipulate it so as to bring it into effective position with respect to the open bolls. Therefore I assert my present invention to be pioneer, wholly new in the art, and that my claims are entitled to the broadest interpretation.

The stem A is actuated by mechanism disposed in a casing E, preferably of sheet metal, and provided with a pistol-grip F and a pivoted trigger G in convenient position to be moved by the fingers of the operator when the grip F is in his hand. The trigger G is in bell-crank form and carries at its free end the curved rack H, which engages with the pinion I, journaled within the casing. On the shaft of pinion I is the large gear J, which in turn engages with the bevel-pinion K on the rod B of stem A. Said rod enters the casing E and is received at its end in a fixed bearing L. It is also provided with a doubled-flanged collar M, between the flanges of which the metal wall of the casing enters to form a close joint. A helical spring N is attached at one end to the casing, as shown at O, and at the other end to the rack H, its effect being normally to hold the trigger forward and the rack in its most elevated position. The trigger is preferably curved laterally, so as to afford a rounded surface for the fingers to bear against and also conform to the curvature of the grip when retracted into proximity thereto.

The operation of the device is as follows: The parts being in the position shown in Fig. 1, the operator grasps the grip in his right hand, with his fingers bearing on the trigger G. He then moves the stem A in the direction of its longitudinal axis into the plant and to the lint in an open boll. He then presses on the trigger, so causing the rack H to travel against the resistance of the spring N, and thereby, through gearing I J K, to rotate the stem on its axis with its teeth-points foremost. The speed of rotation in gathering the cotton need not be great, and therefore it is done by the direct pressure of the operator's fingers on the trigger; but when the cotton is to be thrown off from the stem as rapid a revolution in the reverse direction as practicable is to be desired. Hence after the stem has been revolved, as stated, with teeth-points foremost, and thus has become covered with cotton, the operator withdraws the device from the plant and after inserting the loaded stem into the bag, basket, or other receptacle for the gathered cotton which he carries with him simply releases the trigger. The helical spring is now free to retract, and in doing so it sets the stem into very rapid rotation, with the result that the collected cotton is instantly thrown off from the stem. The stem is not introduced sidewise, since that would only result in leaves getting in between it and the cotton, but longitudinally or end foremost.

It will be obvious that this contrivance can be operated effectively by any one, no matter how ignorant or unskilled. It simply takes the place of his fingers. He picks the cotton out of the open bolls with it and with no more exertion than is required to open and shut his hand at the proper intervals to make the stem turn points foremost to gather and in the reverse direction to release the cotton.

I claim—

1. The improvement in the art of hand cotton-picking which consists in manually moving in the direction of its longitudinal axis a single stem having circumferential teeth into engagement with the cotton in the open boll and manually rotating said stem on said longitudinal axis points of teeth foremost to gather said cotton.

2. The improvement in the art of hand cotton-picking which consists in manually moving in the direction of its longitudinal axis a single stem having circumferential teeth into engagement with the cotton in the open boll and manually rotating said stem on said longitudinal axis points of teeth foremost to gather said cotton, then withdrawing said loaded stem and then rotating said stem in the reverse direction to release said cotton.

3. A single cotton-picking stem, a support therefor constructed to be held in the hand of the operator and means combined with said support and stem for rotating said stem on its longitudinal axis.

4. A single cotton-picking stem, a support therefor constructed to be held in the hand of the operator, means combined with said support and stem for rotating said stem on its longitudinal axis in relatively opposite directions.

5. A single cotton-picking stem, a support therefor constructed to be held in one hand of the operator, and means combined with said support and stem and controlled by said hand for rotating said stem on its longitudinal axis.

6. A single cotton-picking stem, a support therefor constructed to be held in one hand of the operator, mechanism combined with said support and stem for rotating said stem on its longitudinal axis, and a trigger device controlling said mechanism and constructed to be operated by the fingers of said holding-hand.

7. A single cotton-picking stem having circumferential teeth, mechanism for manually rotating said stem on its longitudinal axis and a support for said stem and said mechanism, the said support being constructed to be held in the hand of the operator.

8. A single cotton-picking stem having circumferential teeth, a casing constructed to be held in the hand of the operator and supporting said stem, mechanism for rotating said stem on its longitudinal axis within said casing and means exterior to said casing for manually actuating said mechanism.

9. A cotton-picking stem, a casing constructed to be held in the hand of the operator and supporting said stem, mechanism for rotating said stem on its longitudinal axis, means exterior to said casing for manually actuating said mechanism and a spring within said casing for rotating said stem in the reverse direction when said manually-controlled mechanism is released.

10. A cotton-picking stem having circumferential teeth, mechanism for manually rotating said stem on its longitudinal axis points of teeth foremost, mechanism for automatically rotating said stem in the reverse direction when said manual contact is released and a support for said stem and said mechanism, the said support being constructed to be held in the hand of the operator.

11. A casing constructed to be held in the hand of the operator, a cotton-picking stem journaled at one end in said casing, an actuating-lever pivoted in said casing, and gearing for rotating said stem interposed between said stem and said lever.

12. A casing having a pistol-grip constructed to be held in the hand of the operator, a cotton-picking stem journaled at one end in said casing, a bell-crank lever pivoted in said casing and having an arm in front of said pistol-grip and at its other end a curved rack, and gearing for rotating said stem interposed between said stem and said rack.

13. A casing constructed to be held in the hand of the operator, a cotton-picking stem journaled at one end in said casing, an actuating-lever pivoted in said casing, gearing for rotating said stem interposed between said lever and said stem, and a retracting-spring; said spring operating upon said gearing to rotate said stem in a direction opposite to that in which said stem is rotated by the impressed movement of said lever on its pivot.

In testimony whereof I have signed my name to this specification in the presence of two subscribing witnesses.

JAMES SAVAGE MURDOCH.

Witnesses:
   AUGUSTINE T. SMYTHE,
   DONALD McKAY FROST.